United States Patent
Pfister et al.

(10) Patent No.: US 7,218,324 B2
(45) Date of Patent: May 15, 2007

(54) SCENE REFLECTANCE FUNCTIONS UNDER NATURAL ILLUMINATION

(75) Inventors: Hanspeter Pfister, Arlington, MA (US); Wojciech Matusik, Lexington, MA (US); Matthew M. Loper, Cambridge, MA (US)

(73) Assignee: Mitsubishi Electric Research Laboratories, Inc., Cambridge, MA (US)

( * ) Notice: Subject to any disclaimer, the term of this patent is extended or adjusted under 35 U.S.C. 154(b) by 519 days.

(21) Appl. No.: 10/871,908

(22) Filed: Jun. 18, 2004

(65) Prior Publication Data

US 2005/0285860 A1 Dec. 29, 2005

(51) Int. Cl.
*G06T 15/50* (2006.01)
(52) U.S. Cl. ...................................... 345/426
(58) Field of Classification Search ............... None
See application file for complete search history.

(56) References Cited

U.S. PATENT DOCUMENTS

| | | | | |
|---|---|---|---|---|
| 5,818,975 | A * | 10/1998 | Goodwin et al. | 382/274 |
| 6,639,597 | B1 * | 10/2003 | Zwicker et al. | 345/427 |
| 6,791,540 | B1 * | 9/2004 | Baumberg | 345/419 |
| 6,919,889 | B2 * | 7/2005 | Grzeszczuk et al. | 345/420 |
| 6,930,685 | B1 * | 8/2005 | Sakagawa et al. | 345/426 |
| 6,961,461 | B2 * | 11/2005 | MacKinnon et al. | 382/164 |
| 7,091,973 | B1 * | 8/2006 | Cohen | 345/426 |
| 2004/0125103 | A1 * | 7/2004 | Kaufman et al. | 345/419 |
| 2005/0078116 | A1 * | 4/2005 | Sloan et al. | 345/502 |
| 2005/0206614 | A1 * | 9/2005 | Brosnan et al. | 345/156 |

OTHER PUBLICATIONS

Chuang et al., "Environment matting extensions: Towards higher accuracy and real-time capture." In *Computer Graphics*, SIGGRAPH 2000 Proceedings, 121-130. 2000.
Debevec et al., "Recovering high dynamic range radiance maps from photographs." In *Computer Graphics*, SIGGRAPH 97 Proceedings, 369-378. 1997.
Debevec et al., "Acquiring the reflectance field of a human face." In *Computer Graphics*, SIGGRAPH 2000 Proceedings, 145-156. 2000.
Georghiades et al. "Illumination based image synthesis: Creating novel images of human faces under differing pose and lighting." In *IEEE Workshop on Multi-View Modeling and Analysis of Visual Scenes*, 47-54. 1999.
Hawkins et al. "A photomeric approach to digitizing cultural artifacts." In *2nd International Symposium on Virtual Reality, Archaeology, and Cultural Heritage*. 2001.
Kautz et al. "Fast, arbitrary brdf shading for low frequency lighting using spherical harmonics." In *Eurographics Workshop on Rendering*, 291-296. 2002.

(Continued)

*Primary Examiner*—Mark Zimmerman
*Assistant Examiner*—Enrique L. Santiago
(74) *Attorney, Agent, or Firm*—Dirk Brinkman; Clifton D. Mueller; Gene V. Vinokur (57) ABSTRACT

A method and system estimates a reflectance function of an arbitrary scene. The scene is illuminated under various lighting condition. For each lighting condition there is an associated illumination image and an observed image. Multiple, non-overlapping kernels are determined for each pixel in a reflectance image from the pairs of illumination and observed images. A weight is then determined for each kernel to estimate the reflectance function represented as the reflectance image.

16 Claims, 7 Drawing Sheets

OTHER PUBLICATIONS

Lehtinen et al. "Matrix radiance transfer." In *Symposium on Interactive 3D Graphics*, 59-64. 2003.

Malzbender et al. "Polynomial texture maps." In *Computer Graphics*, SIGGRAPH 2001 Proceedings, 519-528. 2001.

Masselus et al. "Relighting with 4d incident light fields." *ACM Transactions on Graphics (TOG)* 22, 3, 613-620. 2003.

Matusik et al. "Image-based 3d photography using opacity hulls." *ACM Transaction on Graphics 21*, 3 (Jul.), 427-437. ISSN 0730-0301 (Proceedings of ACM SIGGRAPH 2002). 2002.

Matusik et al. "Acquisition and rendering of transparent and refractive objects." In *Proceedings of the 13th Eurographics Workshop on Rendering*. 2002.

Ng et al. "All-frequency shadows using non-linear wavelet lighting approximation." *ACM Transactions on Graphics 22*, 3, 376-381. 2003.

Peers et al. "Wavelet environment matting." In *Proceedings of the Eurographics Symposium on Rendering*, Eurographics Association, 157-166. 2003.

Ramamoorthi et al. "An efficient representation for irradiance environment maps." In *Proceedings of SIGGRAPH 2001*, 497-500. 2001.

Sloan et al. "Precomputed radiance transfer for real-time rendering in dynamic, low-frequency lighting environments." *ACM Transaction on Graphics 21*, 3 (Jul.), 527-536. ISSN 0730-0301 (Proceedings of ACM SIGGRAPH 2002). 2002.

Sloan et al. "Clustered principal components for precomputed radiance transfer." *ACM Transactions on Graphics 22*, 3, 382-391. 2003.

Zongker et al. "Environment matting and compositing." In *Computer Graphics*, SIGGRAPH 99 Proceedings, 205-214. 1999.

\* cited by examiner

SCENE REFLECTANCE FUNCTIONS UNDER NATURAL ILLUMINATION

FIELD OF THE INVENTION

This invention relates generally to acquiring and rendering images, and more particularly to estimating reflectance functions in scenes from natural illumination and rendering images according to the estimated reflectance functions.

BACKGROUND OF THE INVENTION

It is desired to acquire images of arbitrary real-world scenes and then to render new or synthetic images of the scene using a reflectance function representing arbitrary natural illumination in the environment. Such a representation has many applications, such as realistic image synthesis, scene analysis, 3D scanning of cultural artifacts, object and face recognition, and relighting of image-based models.

Typical prior art methods require controlled incident illumination, e.g., either a point light source or a structured illumination pattern, and a large number of illumination images. Systems that use controlled incident illumination are usually large, expensive, and fixed in place in studio, even for scenes with small objects. For large scenes, such as a city, land, or seascape, it is impossible to control the illumination.

Therefore, it is desired to use arbitrary natural illumination and a small number of illumination images to determine a good estimation of reflectance in any scene, no matter the size. In addition, it is desired to provide a small, inexpensive and portable system to do the reflectance function estimation.

The problem of natural scene acquisition is well known in computer graphics and computer vision. In general, a reflectance field is acquired. Reflectance fields are also known as bi-directional scattering-surface reflectance (BSSRDF), Debevec et al., "Acquiring the reflectance field of a human face," Computer Graphics, SIGGRAPH 2000 Proceedings, pp. 145–156, 2000.

One can also acquire a distribution function, Nicodemus et al., "Geometric considerations and nomenclature for reflectance," Monograph 160, National Bureau of Standards (US), October 1977. A distribution function is defined as a ratio of incoming to outgoing radiance at two different pixels in a scene, formally, $f_r(\omega_i, \vec{x}_i, \omega_0, \vec{x}_0)$, where $\omega_i$ is the direction of the incident illumination at a pixel $\vec{x}_i$, and $\omega_0$ is an observation direction of radiance emitted at a pixel $\vec{x}_0$. That function is eight-dimensional, assuming a two-dimensional parameterization for the points in the scene.

Because sampling of an eight-dimensional function is challenging, a four-dimensional sub-space or 4D slice of the reflectance field can be used.

For larger scenes, it can be assumed that the incident illumination is far away and arrives at pixels in the scene from direction $\omega_i$, and the reflectance field is acquired for some fixed viewing direction $\omega_0$. The resulting function $f_w(\omega_i, \vec{x}_0)$ is called a weighting function or reflectance function of light transport from distant illumination to the observation point, Zongker et al., "Environment matting and compositing," Computer Graphics, SIGGRAPH 99 Proceedings, pp. 205–214, 1999. However, it is difficult to acquire the 4D reflectance function for arbitrary scenes lit with natural illumination.

Consider a scene where the surface coordinates are discretized into 1000×1000 points, and the incident illumination is represented by a 1000×1000 pixel image. Sampling and tabulating the reflectance function directly requires $10^{12}$ values. This poses a challenge for memory storage. Moreover, it is necessary to take over a hundred high-resolution images, making the acquisition time prohibitively long.

In practice, most direct sampling methods use only low-resolution (low-frequency) incident lighting. Consequently, those methods cannot represent high-frequency effects, such as specularities, refraction, and shadows.

On the other hand, environment matting methods focus on reflectance functions for specular, refractive, and glossy materials. However, environment matting methods have difficulty representing hard shadows or a combination of diffuse and specular materials.

Methods for estimating reflectance functions can be classified as forward and inverse methods. Most forward methods sample the reflectance functions exhaustively and tabulate the results. For each incident illumination direction, the forward method stores weights of the reflectance function for a fixed viewing direction. In practice, only low-resolution incident illumination is used, because one reflectance table has to be stored per scene point. Debevec et al. use highest resolution incident illumination with about two thousand directions.

Polynomial texture maps can improve the compactness of the representation by expressing each reflectance field table with a bivariate polynomial, Malzbender et al., "Polynomial texture maps," Computer Graphics, SIGGRAPH 2001 Proceedings, pp. 519–528, 2001. Those direct methods work very well for diffuse or glossy objects, such as human faces, cultural artifacts, and other objects with complex appearance.

However, those methods cannot represent high-frequency phenomena, such as refractions, light discontinuities, or hard shadows. Furthermore, those methods do not provide progressive refinement of the approximation error with an increasing number of samples.

Wavelet environment matting addresses some of these shortcomings, Peers et al., "Wavelet environment matting," Proceedings of the Eurographics Symposium on Rendering, Eurographics Association, pp. 157–166, 2003. Images with wavelets patterns are used as incident illumination, and a feedback loop determines the next pattern to emit based on the error of the current approximation. The reflectance function is progressively refined as more measurements are made. However, that method requires many wavelet patterns for highly specular and refractive materials, or scenes with hard shadows, e.g., up to 2400 pattern images. Because each pixel stores coefficients of the corresponding wavelet patterns, that representation becomes rather large, e.g., 2.5 GB per environment matte with lossless compression. Rendering is also time consuming because the rendering requires a weighted sum of many wavelet-basis images of the new incident illumination.

It is also possible to measure six-dimensional slices of the eight-dimensional reflectance field by varying both the position and direction of the incident illumination for a fixed viewpoint, Masselus et al., "Relighting with 4D incident light fields," ACM Transactions on Graphics (TOG) 22, 3, pp. 613–620, 2003. They use a projector system for scene acquisition and tabulate the results, which limits the sampling resolution.

Inverse methods observe a scene and determine a probability that the observed output came from a particular region in the incident illumination domain. The incident illumination is typically represented by a bounded region, such as an environment map, which is then modeled as a sum of basis functions, e.g., Gaussian kernels, Blinn et al., "Texture and reflection in computer generated images," Communications of the ACM (SIGGRAPH '76 Proceedings) 19, 10, pp. 542–547, 1976.

The inverse method requires one to determine weights and parameters of basis functions that best explain a given observation, e.g., an image pixel. Environment matting techniques describe the observation in each pixel using only one 2D function. That leads to a very compact representation, and the method works well for specular and refractive objects. That method only works off-line and does not progressively refine approximation errors. Furthermore, only one 2D function is sometimes not expressive enough to capture the properties of complex reflectance functions representing arbitrary scenes under natural illumination, particularly large scenes that can be subject to very complex illumination.

High-quality extensions to environment matting achieve excellent results for specular, refractive, and glossy materials, Chuang et al., "Environment matting extensions: Towards higher accuracy and real-time capture," Computer Graphics, SIGGRAPH 2000 Proceedings, pp. 121–130, 2000. The box functions are replaced by oriented 2D Gaussian kernels, which can provide a compact representation. However, rendering with complex incident illumination is slow, because the Gaussian kernels have to be convolved with the new illumination. Moreover, that method cannot progressively refine the approximation. In addition, the 2D Gaussian kernels have difficulty representing discontinuous or more complex reflectance functions, such as a small specular lobe inside a larger diffuse component. In addition, that method uses a number of non-linear optimization steps, which can produce instabilities and noise.

Hybrid methods combine a forward method for low-frequency components and high-quality environment matting for high-frequency reflections and refractions. The low-frequency data are compressed using principal component analysis (PCA). However, that representation is not compact, and that method does not address any of the other problems described above.

A pre-computed radiance transport reflectance function can increase the realism in real-time rendering. In such a method, the radiance transport is pre-determined using global illumination algorithms and a detailed model of the scene, Sloan et al., "Precomputed radiance transfer for real-time rendering in dynamic, low-frequency lighting environments," ACM Transaction on Graphics 21, pp. 527–536, ISSN 0730-0301, Proceedings of ACM SIGGRAPH 2002, July 2002.

To improve the performance of the rendering, the incident illumination can be represented using spherical harmonics, or wavelets. In that case, the reflectance function, which is typically stored per vertex as a transfer matrix, can be compressed using PCA, or wavelets, Ng et al., "All-frequency shadows using non-linear wavelet lighting approximation," ACM Transactions on Graphics 22, pp. 376–381, 2003.

It desired to provide a system and method for estimating reflectance functions for any sized scene that is accurate at all-frequencies, and that deal with many different illumination effects, including illumination discontinuities such as shadows.

SUMMARY OF THE INVENTION

The invention provides a system and method for estimating reflectance functions, i.e., a description of transport of illumination in an arbitrary scene, for a fixed viewpoint, under arbitrary natural illumination.

The method treats the scene as a 'black-box' linear system that transforms an input signal, i.e., incident light, into an output signal, i.e., reflected light. The method is hierarchical in that the method progressively refines the approximation of the reflectance function until a required precision is reached.

The method uses a novel representation for reflectance fields. In fact, unlike prior art parametric reflectance functions, the reflectance function is in the form of an image, i.e., a reflectance image. Each pixel in the reflectance image is associated with a set of weighted kernels. The reflectance function can then be combined with an image of an arbitrary lighting condition to render a synthetic image of the scene under the arbitrary lighting.

This representation is compact, can be progressively refined, and can determine the relighting of scenes with complex illumination in real-time. The representation and the corresponding method enable efficient estimation of the reflectance functions of scenes with specular, glossy, refractive, and diffuse elements. The method also handles soft and hard shadows, inter-reflections, caustics, and subsurface scattering.

DETAILED DESCRIPTION OF THE PREFERRED EMBODIMENT

System Structure

Figure 1A:
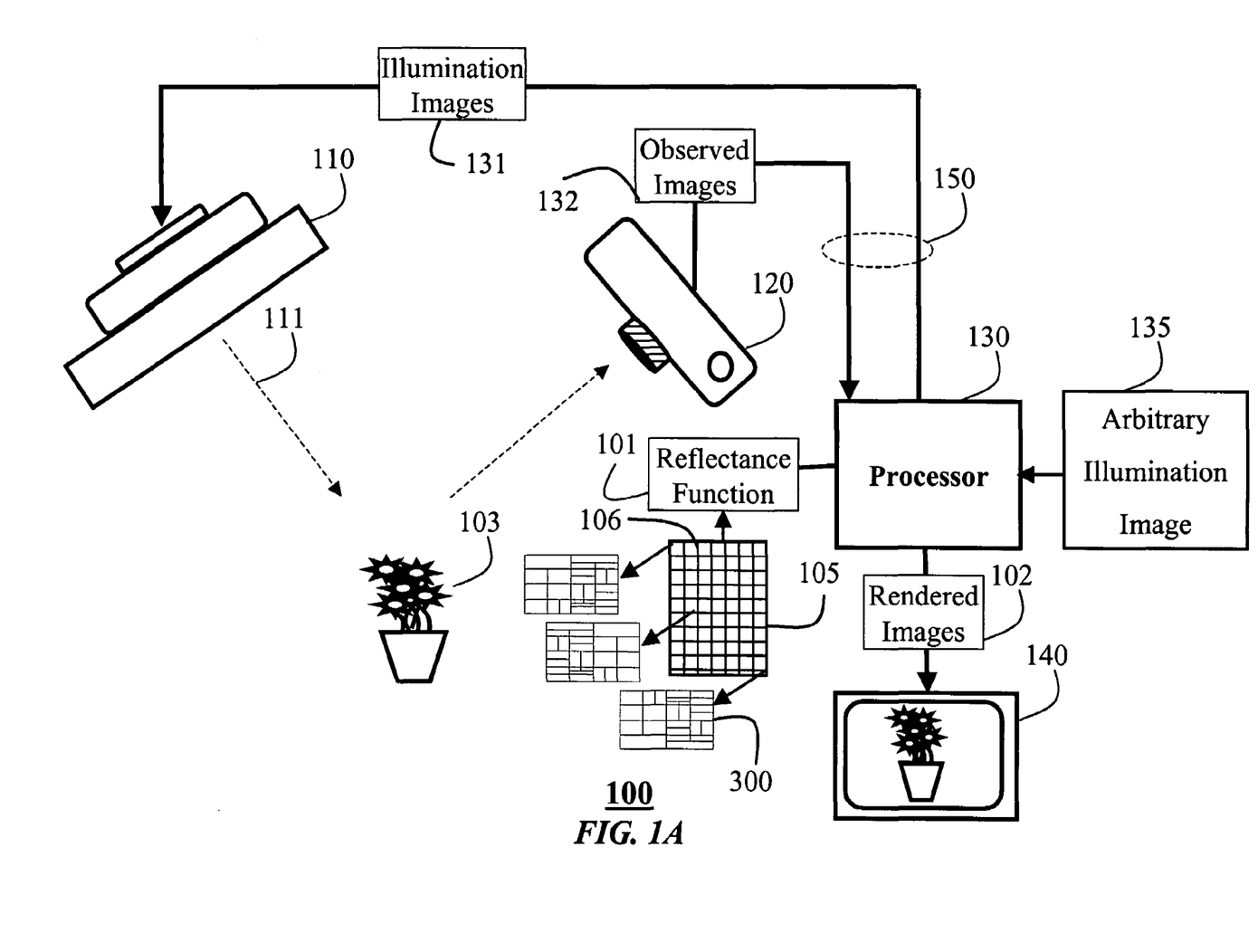
FIG. 1A is a block diagram of a system for estimating a reflectance function according to the invention.

As shown in FIG. 1, our system 100 for estimating a reflectance function 101 and using the estimated reflectance function to render new images 102 of a scene using arbitrary illumination 135.

Figure 3:
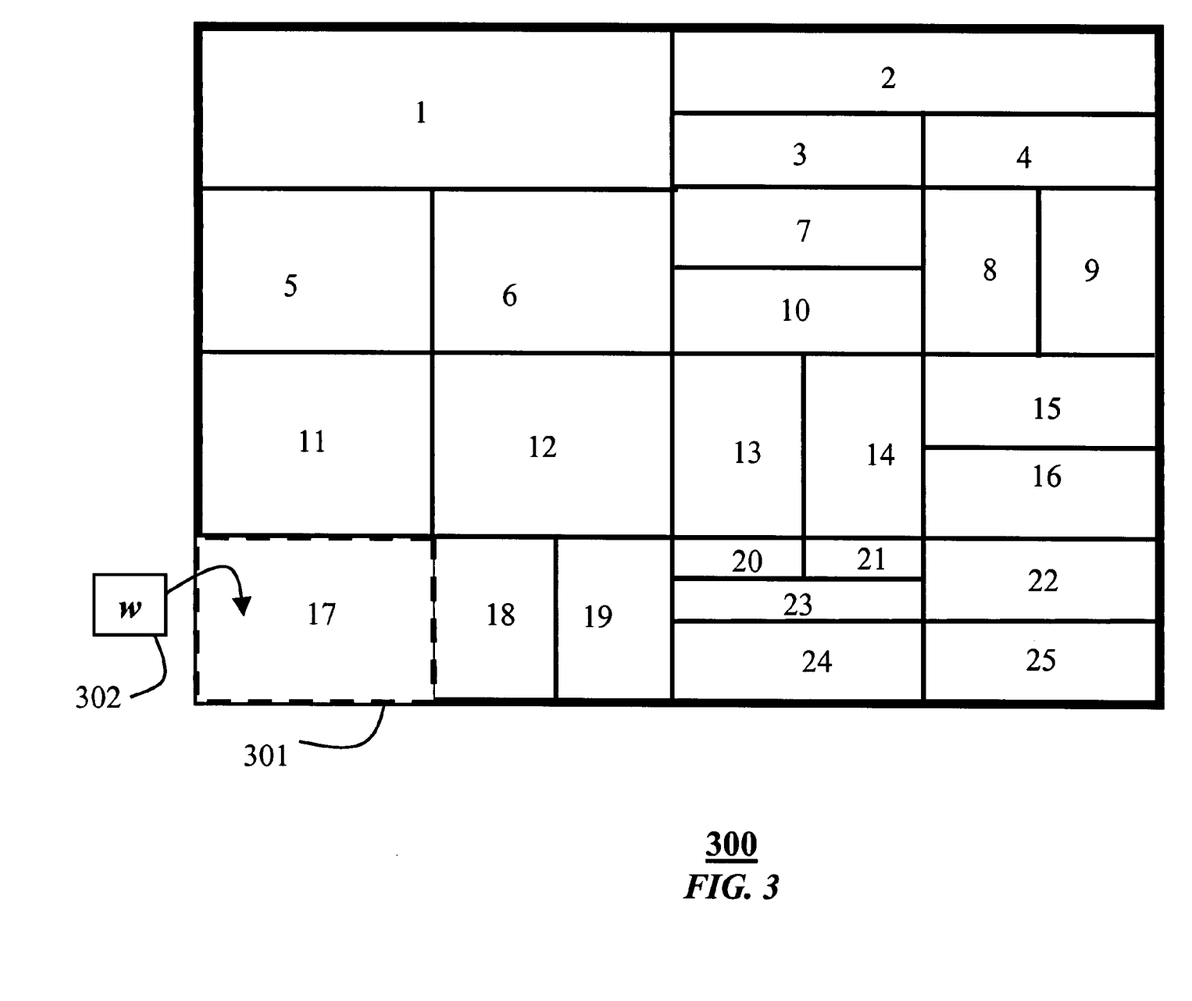
FIG. 3 is a block diagram of a reflectance function represented as a reflectance image subdivided into a set of weighted kernels according to the invention.

The reflectance function 101 according to the invention is in the form of a reflectance image 105 including a plurality of pixels 106. Each pixel is associated with a set 300 of multiple weighted kernels 301, described in greater detail below.

Figure 1B:
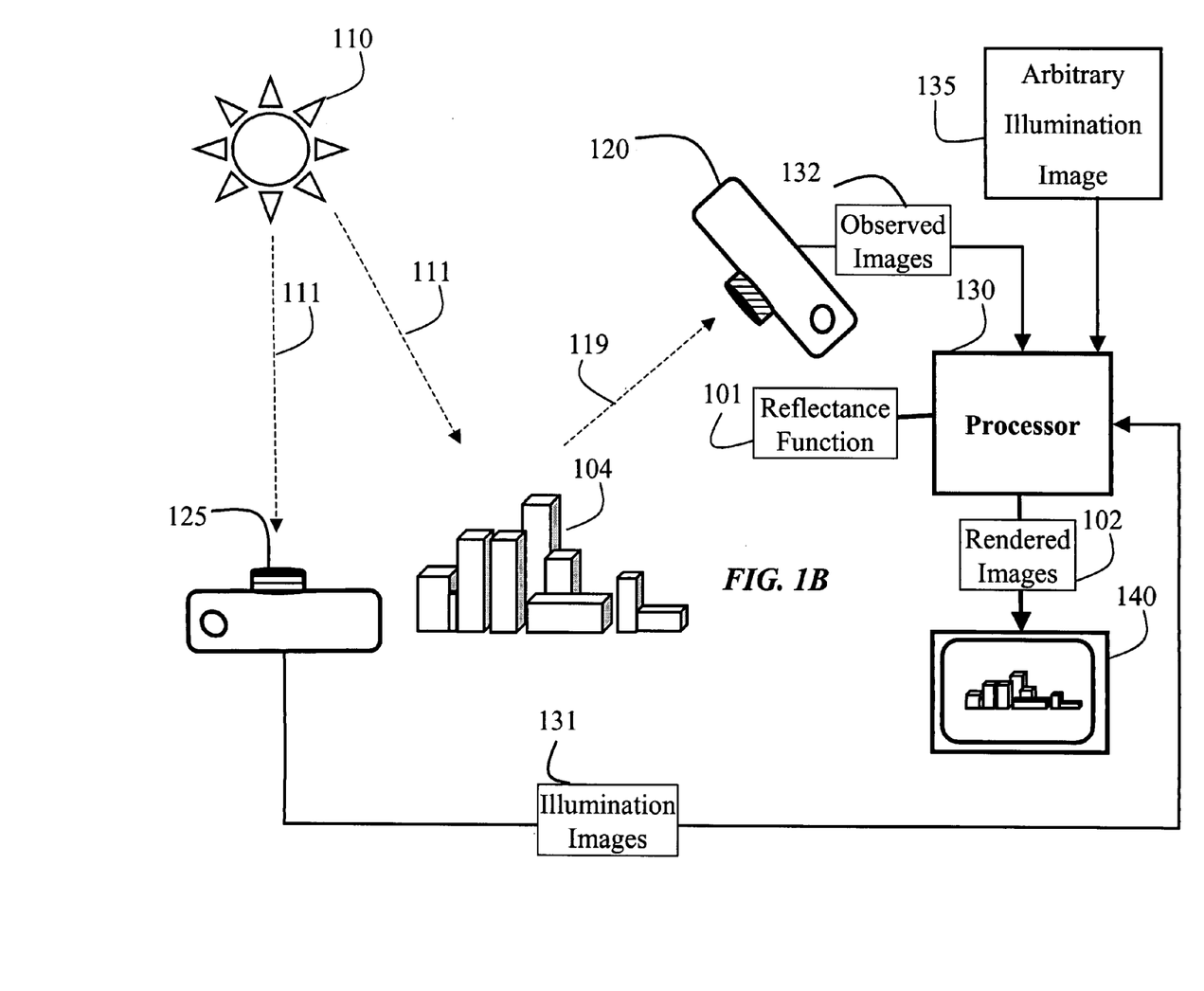
FIG. 1B is a block diagram of an alternative embodiment of the invention.

The system 100 includes a source 110, e.g., a monitor or artificial or natural light 111 in a surrounding scene, see FIG. 1B, a sensor 120, a processor 130, and an output device 140 for the rendered image 102, all connected by a network. For 'still-life' scenes, the scene can include an object 103. The sensor can be a camera. The sensor acquires observed images 132 of the scene subject to the illumination 111.

The monitor 110 generates high-resolution incident illumination 111 according to illumination images 131. The monitor is, for example, a CRT set to 800×600 output resolution at an 85 Hz refresh rate.

In this arrangement, one observed image 132 is acquired for each illumination image 131, i.e., the observed and illumination images are in pairs 150.

As shown in FIG. 1B, we can also measure the incident illumination 111 in a large scale scene 104 using, e.g., a second sensor 125 to acquire the corresponding illumination images 131. This may be appropriate for estimating the reflectance of large outdoor objects 104, such as a city, where it is impossible to provide synthetic incident illumination, and natural light is readily available. In this arrangement, one observed image 132 is acquired for each different illumination condition, i.e., sunny morning, cloudy evening, moonlight, etc. Again, the observed 132 and illumination images 131 are in pairs 150.

It should be noted that invention is not limited to scenes illuminated by visible light. It should be noted that any form of detectable electromagnetic radiation can be used for illuminating the scene with a corresponding source of the radiation. It should also be noted that the illumination and observed images can be generated using computer graphics and animation techniques.

The processor 130 uses conventional hardware, e.g., a computer system, to execute the method according to the invention, described in greater detail below.

The output device 140 can be a display unit, projector, or a printer.

Ideally, the system 100 generates or is subject to high-resolution incident illumination from all directions and from far away. For small objects 103, this can be accomplished by using a larger monitor 110, e.g., a large LCD screen, positioned several meters from the scene 103. Although, it should be noted that standard monitors, or laptop screens can be used, making the system portable.

As shown in FIG. 1B for an alternative embodiment, a second sensor 125 can be used to acquire images that measure the natural illumination 111 in the surrounding scene. In this case, the natural illumination is used to estimate the reflectance function 101.

Calibration

Figure 2:
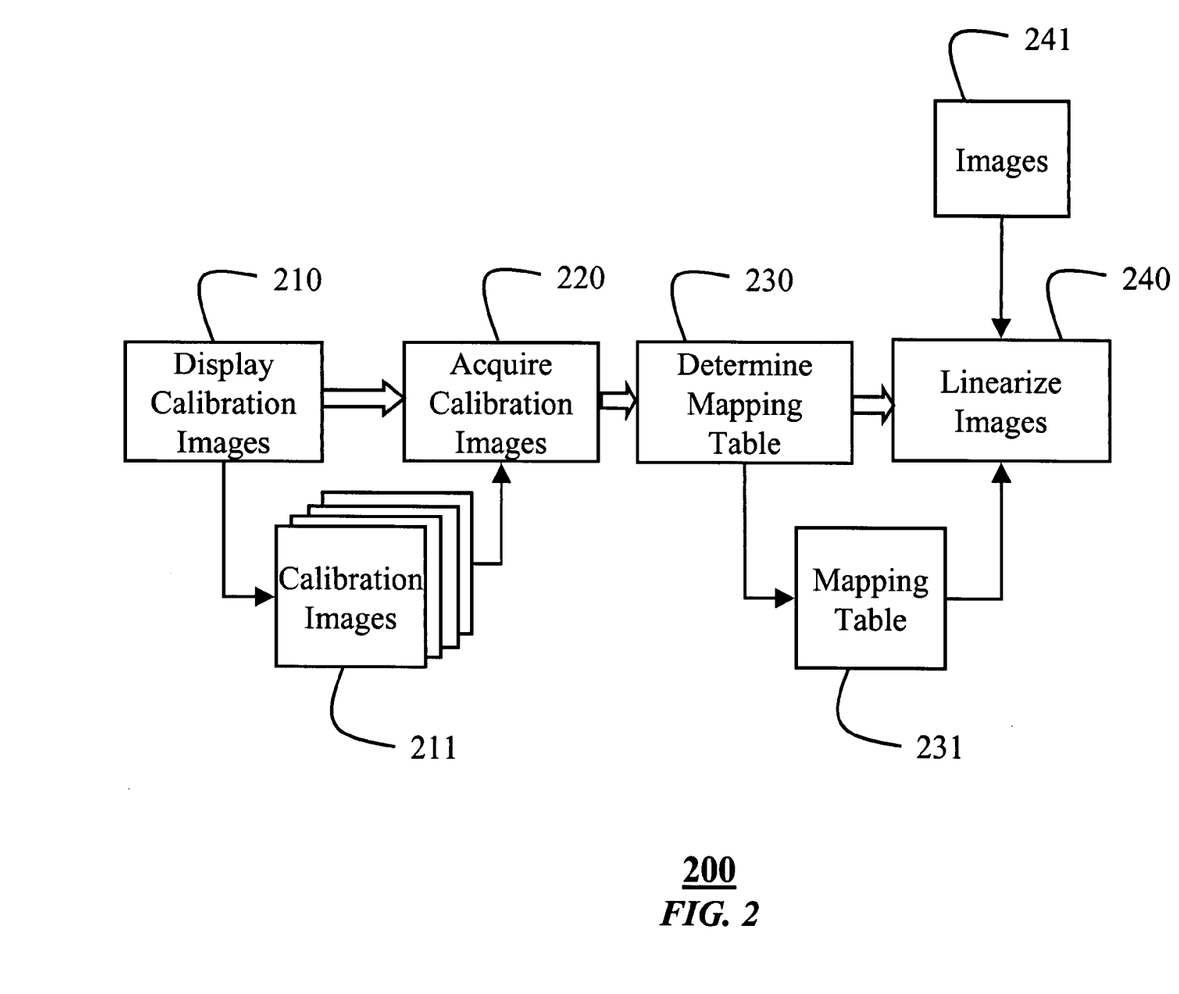
FIG. 2 is a flow diagram of a calibration process used by the invention.

We assume that both the monitor 110 and the camera 120 have linear responses. We can confirm that the relationship between exposure time and radiance values is linear over the operating range of the camera. We use a calibration procedure 200 to correct for the non-linearity of the CRT monitor 110, as shown in FIG. 2.

We display 210 calibration images 211 with uniform color on the monitor 110. The images are generated by varying values in a framebuffer, for each color channel, between 0 and 255 in increments of one, keeping the other two channels at a fixed value, e.g., 128. Then, we acquire 220 corresponding calibration output images with the camera 120. The observed images are used to determine 230 a mapping table 231 between framebuffer values of the monitor and the radiance acquired by the camera 120. We use the mapping table to linearize 240 images 241 during an optimization step when our method is in operation.

A single image is usually insufficient to capture the full dynamic range of a scene because some areas may be underexposed while other areas are overexposed. Therefore, we acquire images using high-dynamic range (HDR) imaging as described by Debevec et al., "Recovering high dynamic range radiance maps from photographs," Computer Graphics, SIGGRAPH 97 Proceedings, pp. 369–378, 1997.

For each image 241, we acquire four calibration images 211 with exponentially increasing exposure times, and use a least-squares linear fit to determine a slope of a response line. We store the slope of the response line as one floating point radiance measurement per pixel in the mapping table 231. Before making any measurements, we acquire one HDR image with ambient light in the room, and subtract that 'ambient' image from each observed image.

In order to minimize the amount of computation and storage, we determine which acquired pixels show scene elements of interest in a pre-processing step. This can be done either manually, by defining a background mask, or automatically through background subtraction.

Representation

The notation used to describe our invention is according to Ng et al., "All-frequency shadows using non-linear wavelet lighting approximation," *ACM Transactions on Graphics* 22, 3, pp. 376–381, 2003, and Peers et al., "Wavelet environment matting," *Proceedings of the Eurographics Symposium on Rendering*, Eurographics Association, pp. 157–166, 2003.

We assume that the incident illumination 111 is 2D parameterizable, i.e., the illumination can be represented by an environment map. If we consider the problem as a black box linear system, then we can write:

$$B=TL, \quad (1)$$

where L is the incident illumination, stacked in a vector, B is a resulting new or 'relit' image, also stacked in a vector, and T is the light transport matrix or reflectance function 101.

Each row in the matrix T represents a reflection function $T_i$, thus $T=[T_0, \ldots, T_n]$. A pixel value of a single pixel in the image $B=[b_i]$ is:

$$b_i = T_i \cdot L. \quad (2)$$

Note that the pixel value $b_i$ is the inner product of two vectors $T_i$ (reflectance functions) and L (incident illumination). We approximate $T_i$ in equation (2) as a weighted sum of a set of 2D rectangular kernels, such that:

$$T_i \approx \sum_k w_{k,i} R_{k,i}, \quad (3)$$

where $w_{k,i}$ are weights 302 of each 2D rectangular kernel $R_{k,i}$ 301.

FIG. 3 shows an example set 300 of the axis-aligned, weighted 2D kernels 1–25 according to the invention. Instead of just using one unweighted kernel per pixel, we consider multiple kernels of varying weights 302, size and position. The set of kernels can partition or 'tile' an image 301 into rectangular areas, although this is not required.

Assuming that light transport through the scene is linear and additive, equation (2) becomes:

$$b_i \approx \sum_k w_{k,i} R_{k,i} \cdot L. \quad (4)$$

The term $(R_{k,i} \cdot L)$ determines a contribution of the incident illumination L coming from the region of the corresponding 2D kernel $R_{k,i}$. We use summed-area tables to evaluate $(R_{k,i} \cdot L)$ for any of the kernels. This leads to a very efficient rendering process. For each pixel $b_i$ 106 in the reflectance image 105 we store a vector with weights $w_{k,i}$ 302 and a position and size of the associated set of multiple kernels 1–25, to provide robustness at all frequencies.

Assumptions

As described above, we assume that the light transport through the scene is a linear process. We also assume that the response curve of the light source 110, and of the sensing device 120, can be linearized, as described for FIG. 2.

Furthermore, we assume that the scene elements are static and that the incident illumination 111 is 2D parameterizable.

Estimation Process

The problem of reflectance field acquisition is now equivalent to estimating an impulse response function of a linear system with multiple inputs, i.e., the incident illumination L 111, and multiple outputs, i.e., the observation images B 132.

Method Input and Output

The process can be described as:

$$B_j = TL_j, \quad (5)$$

where $L_j$ is a set of different natural incident illumination 111, e.g., due to the illumination images 131 or the direct source 110 in FIG. 1B, and $B_j$ is the resulting set of observed images 132 of the scene, and T describes the reflectance field.

In the embodiment of FIG. 1A, we use hundreds of illumination images 131 of indoor and outdoor scenes, e.g., kitchens, gardens, cities, trees, etc. The illumination images 131 are displayed on the monitor 110 to simulate arbitrary natural illumination in a studio setting. We denote a pixel $b_{i,j}$ as pixel i in the $j^{th}$ observed image 132. Given $L_j$ and $b_{i,j}$, the process estimates the weights $w_{k,i}$, positions, and sizes of the set 300 of multiple 2D rectangular kernels 1–25, for each pixel 106 $b_i$ in the reflectance field.

As we increase the number n of illumination images 131 and corresponding observed output images 132, we refine the set of kernels 300 to improve the estimate of the reflectance function 101.

Note that we determine the weights 302 independently for each (RGB) color channel. However, we store only one set of 2D kernel positions per pixel. This means that we do not model dispersion, where one color channel may influence the others, although this is possible in principle. This also assumes that there is no color cross-talk between monitor spectra and camera pixel filters.

Figure 4:
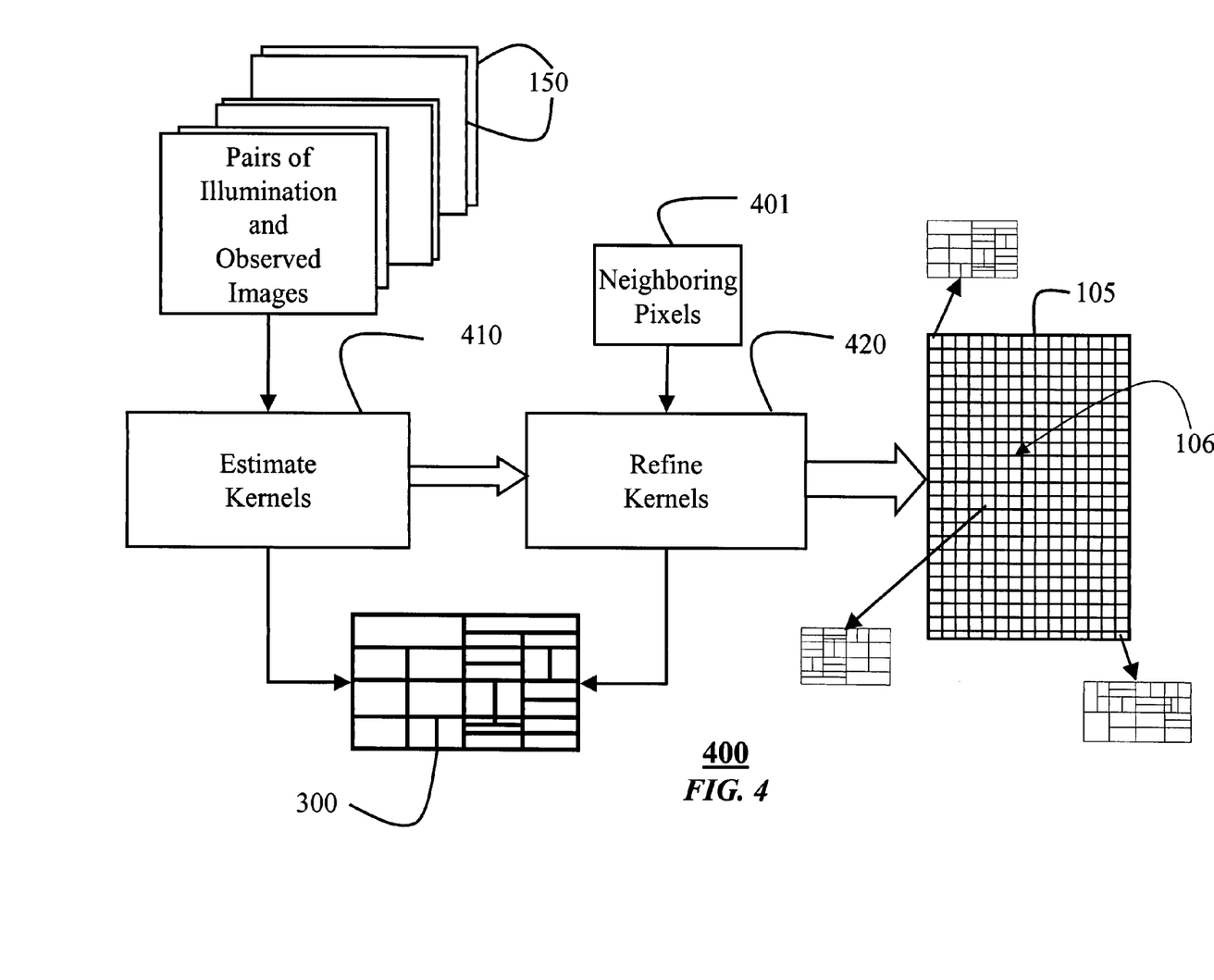
FIG. 4 is a flow diagram of a method for estimating a reflectance function according to the invention.

As shown in FIG. 4, first, for each pixel $b_i$ 106 in the reflectance image 105, we estimate 410 the corresponding set of kernels 300 using a hierarchical quad-tree partitioning of the incident illumination map.

In the second step, we refine the set of kernels 300 using the estimates of other pixels 401 in a small neighborhood around each pixel $b_i$.

Kernel Subdivision

We observe that the problem can be solved independently for each pixel $b_i$. We solve the following optimization problem:

$$\operatorname{argmin}_W \|A_i W - B_i\|^2, \quad (6)$$

such that $W \geq 0$. The stacked vector $W_i$ contains the weights $w_{k,i}$ 302 to be determined for a single pixel $b_i$ 106. $A_{ik,j} = [R_{k,i} \cdot L_j]$, where $L_j$ is one of the illumination images, and $B_i = b_{i,j}$.

If the kernel weights w are constrained to be positive, the solution is stable. Equation (6) is equivalent to the following linear system:

$$\operatorname{argmin}_W 0.5 W_i^T A_i^T A_i W_i - W_i^T A_i^T B_i, \quad (7)$$

such that $W \geq 0$. The estimated weights satisfy the system best in a least-squares sense.

Hierarchical Quad-Tree Subdivision

Figure 5:
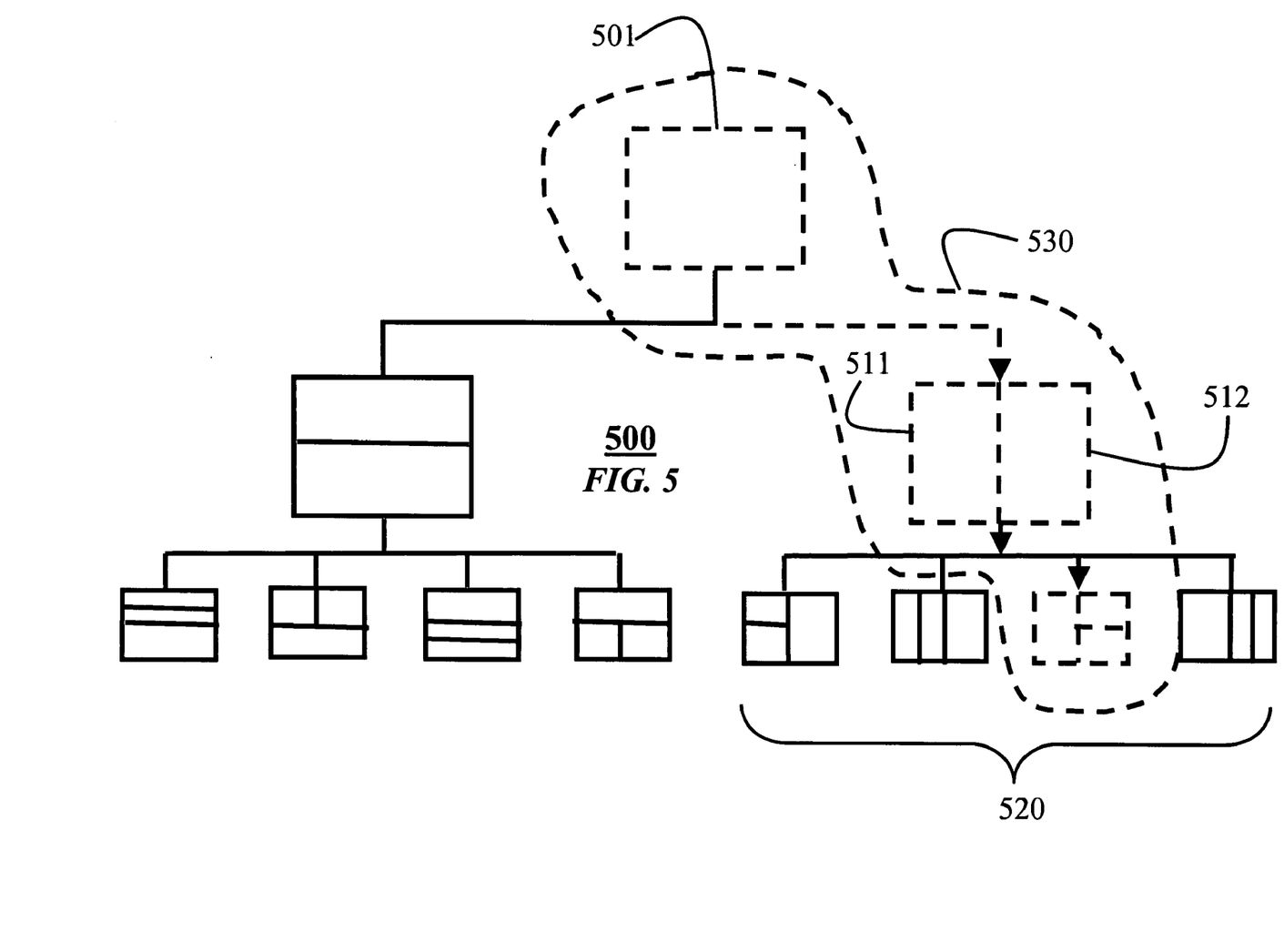
FIG. 5 is a block diagram of a hierarchical subdivision of a reflectance image according to the invention.

As shown in FIG. 5, we use a hierarchical quad-tree subdivision 500 of each illumination image 131 to find positions and sizes of the kernels for each pixel $b_i$.

We start with a kernel 501 that occupies the entire illumination image. We subdivide the illumination image into two equal size rectangles 511–512. Having the option of subdividing the kernel horizontally or vertically, we select the subdivisions that yield a lowest error in Equation (6). The indicated path 530 indicated by the dashed lines shows the subdivisions that yield the least error.

To measure this error, we solve for the kernel weights 302 using Equation (7). In the second iteration we have four possible splits 520 of the two kernels from the first iteration, and so on. The recursive subdivision stops when the set of K kernels are determined, or K-1 subdivisions have been made. We found that K=25 yields a good quality, while still minimizing processing time.

In general, we have 2·k possible subdivisions in the $k^{th}$ iteration. Thus, in the $k^{th}$ iteration, we perform $O(k^2)$ quadratic programming optimizations using Equation (7).

Instead of trying all possible equal-size subdivisions, we subdivide the kernel with the highest energy. We define the energy as area×weight. This means we only perform O(k) quadratic programming optimizations per pixel, which improves the performance by a factor of ten.

However, our energy measure is not perfect, and we may miss the optimal split for a given kernel. This leads to suboptimal estimations, which may need to be spatially corrected.

Spatial Correction

We perform the spatial correction for each pixel $b_i$ having an error, according to Equation (6), bigger than a threshold τ. We observe that the kernels for neighboring pixels are usually similar. Our refinement process 420 proceeds as follows.

For each pixel bi, try the kernel locations from each neighbor and solve for the new weights using Equation (7). Determine a new error using Equation (6), and determine if the error is smaller than the current error. If the error is smaller, then copy the kernel position and sizes from the neighbor that yields the lowest error. We iteratively repeat this procedure for all the points with high error until the error falls below a threshold. This assures spatial coherence and reduces the overall error.

Next, we optimize the position of all the new kernels by moving the kernels one pixel in each direction until the error remains constant. Spatial correction improves the estimation of the reflectance function, especially when the number of illumination images 131 is small, e.g., less than thirty.

If the number of illumination images is large, e.g., greater than a hundred, then the error correction typically does not need to be performed.

Rendering

At this point, the reflectance function 101, represented by the reflectance image 105 of multiple weighted kernels 301, can be used to render a new image 102, for arbitrary illumination conditions 135.

We use an interactive renderer for our reflectance functions. The renderer is implemented in software. The new arbitrary illumination 135 is loaded and converted into a summed area table.

Figure 6:
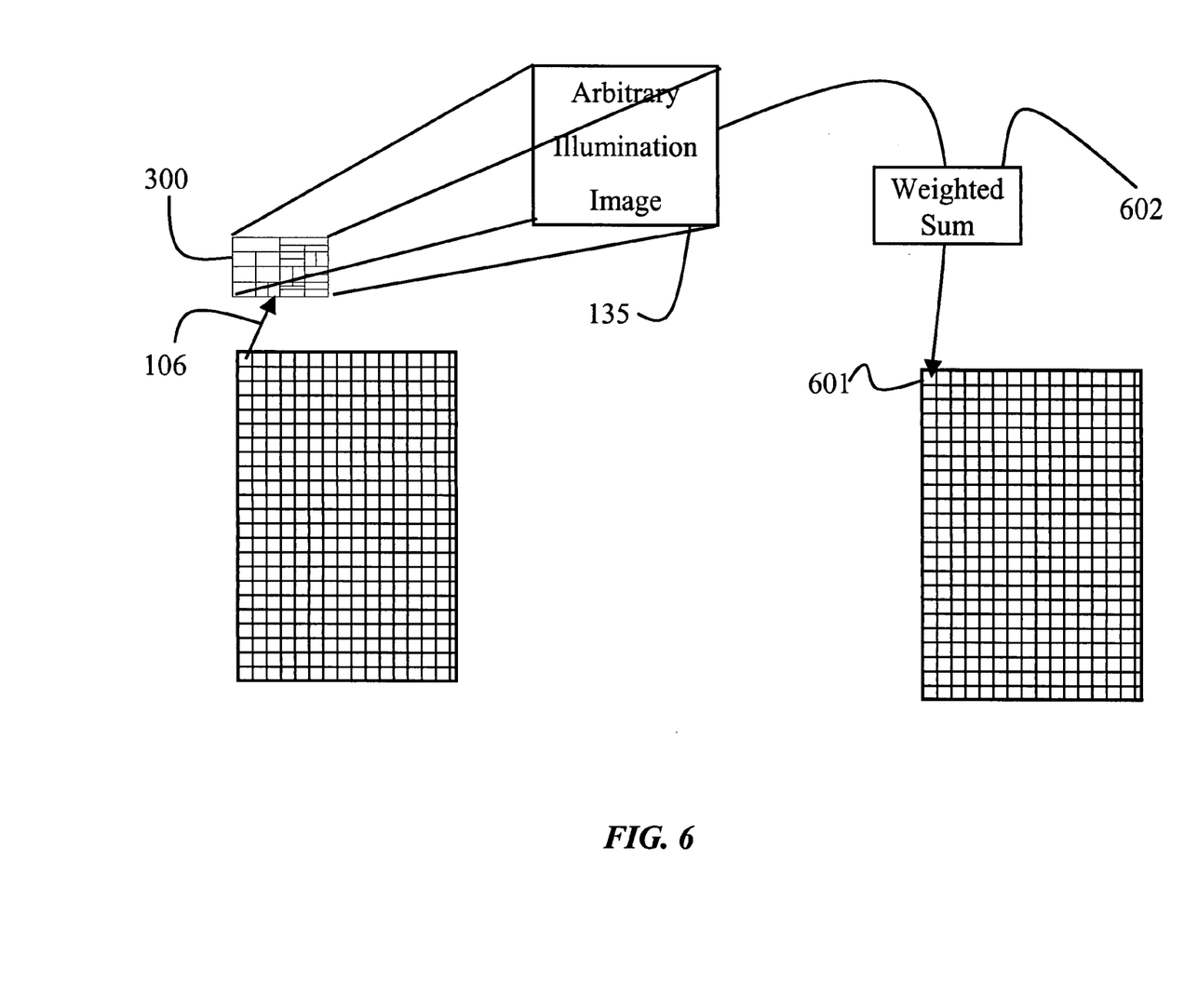
FIG. 6 is a block diagram of rendering with a reflectance function according to the invention.

As shown in FIG. 6, for each pixel 106 in the reflectance image, we evaluate Equation (4) to determine a color of a corresponding pixel 601 in the rendered image 102 as a weighted sum 602 of the set of kernels 300 when applied to the new illumination image 135.

Our system and method can be applied to a variety of scenes, such as scenes that include specular, refractive, diffuse, and glossy objects. Our invention also works well for scenes with soft shadows, hard shadows, and subsurface scattering.

The resolution of the illumination images is 800×600 pixels, and the resolution of observed images is 1024×768. The number of kernels per pixel is 25, which works well for all of the above scenes. In addition to our set of illumination images, we use a test set of natural images for validating the reflectance function estimation. As a standard test of the quality of reflectance function estimation, we first compare the actual picture of the scenes under new illumination with the prediction obtained using our estimated reflectance function.

In general, our prediction works very well for glossy, diffuse, and transparent objects. The hard shadows near the objects and soft shadows farther away from the objects are reproduced well, and inter-reflection is reproduced correctly. Diffuse elements are also reproduced correctly. For hollow objects, both subsurface scattering and refractions are reproduced correctly.

Improvements

The equal kernel subdivision process described above can be improved, for example, by using unequal subdivision, similar to a two-dimensional kd-tree rather than a quad-tree.

Effect of the Invention

The invention provides a system and method for estimating a reflectance function that has the following properties.

The method does not require a structured illumination pattern or a point light source. Instead, the invention can use projected or measured arbitrary natural illumination.

The method works well for both high frequency, e.g., specular, and low frequency, e.g., diffuse, components of reflectance functions.

The invention also handles scenes with discontinuous reflectance fields, e.g., hard shadows. The underlying representation of the reflectance field is compact. One 4D slice of a reflectance field can be well represented with the same storage required for a small number of 2D slices.

By using progressive refinement, the reflectance function according to the invention enables integration of complex changing incident illumination interactively in real-time.

Although the invention has been described by way of examples of preferred embodiments, it is to be understood that various other adaptations and modifications may be made within the spirit and scope of the invention. Therefore, it is the object of the appended claims to cover all such variations and modifications as come within the true spirit and scope of the invention.

We claim:

1. A method for estimating a reflectance function of a scene, comprising:
   determining, for each pixel in a reflectance image acquired of the scene, a set of multiple kernels; and
   determining a weight for each kernel to estimate the reflectance function of the scene as represented by the reflectance image and rendering a new image of the scene under new illumination using the reflectance function.

2. The method of claim 1, further comprising:
   acquiring a set of illumination images, each illumination image having an associated illumination;
   illuminating the scene with each illumination image;
   acquiring, for each illumination image, an observed image of the scene subject to the associated illumination of the illumination image; and
   determining the reflectance image from the pairs of illumination and observed images.

3. The method of claim 2, in which the illumination is arbitrary natural illumination.

4. The method of claim 1, further comprising:
   acquiring a set of illumination images, each illumination image having an associated illumination;
   acquiring, for each illumination image, an observed image of the scene subject to the associated illumination of the illumination image; and
   determining the reflectance image from the pairs of illumination and observed images.

5. The method of claim 1, in which the kernels are non-overlapping, rectangular of varying sizes, and aligned with axes of the reflectance image.

6. The method of claim 2, in which scene illumination is performed by displaying the illumination images on a monitor.

7. The method of claim 4, in which the scene illumination is measured by a sensor.

8. The method of claim 1, further comprising:
   estimating the weights by quadratic programming.

9. The method of claim 1, in which the new illumination is due to an arbitrary illumination image.

10. The method of claim 9, in which a value of each pixel in the new image is a weighted sum of the multiple kernels of the corresponding pixel in the reflectance image when applied to the arbitrary illumination image.

11. The method of claim 2, in which the set of multiple kernels is determined using a hierarchical kd-tree partitioning of the set of illumination images.

12. The method of claim 11, in which the partitioning is according to subdivisions that yield a lowest error.

13. The method of claim 12, in which the subdivisions are based on an energy of each kernel.

14. The method of claim 13, in which the energy is an area of the kernel times a weight of the kernel.

15. The method of claim 1, in which a number of kernels per pixel is greater than one.

16. The method of claim 1, in which a radiance associated with each kernel is proportional to an area of the kernel.

* * * * *